United States Patent [19]

Michonski

[11] 4,030,176

[45] June 21, 1977

[54] ADJUSTABLE CUTTING TOOL

[75] Inventor: Ronald E. Michonski, Rochester, Mich.

[73] Assignee: General Electric Company, Schenectady, N.Y.

[22] Filed: Mar. 29, 1976

[21] Appl. No.: 671,458

[52] U.S. Cl. .................................. 29/96; 408/154; 408/173; 408/179

[51] Int. Cl.² .......................................... B26D 1/00

[58] Field of Search .......... 408/153, 154, 173, 179, 408/197; 29/96

[56] References Cited

UNITED STATES PATENTS 3,236,125  2/1966  Lundgren ........................ 408/197
3,782,849  1/1974  Mizoguchi ........................ 408/197

Primary Examiner—Leonidas Vlachos

[57] ABSTRACT

A cartridge for adjustably mounting cutter bits on a toolholder is provided. Lateral adjustment of the cartridge is achieved before or after insertion of the cartridge in the toolholder by sliding interaction of adjusting wedge means and a mating surface on the cartridge body actuated by a rotatable eccentric pin. Longitudinal cartridge adjustment is by adjustable means mounted in the end of the cartridge body. The cutting edge angularity of the insert is maintained at all times. Additionally, full mounting surface contact is preserved.

7 Claims, 3 Drawing Figures

ADJUSTABLE CUTTING TOOL

This invention relates to an adjustable cartridge for mounting cutter bits on toolholders. More particularly, the invention relates to such a cartridge which can be, as desired, either preset and then inserted in the receiving recess within the toolholder, or, alternatively, inserted in the toolholder and thereafter set as desired. Additionally, cutting inserts can be replaced while the cartridge is situated within the toolholder and the cartridge then adjusted as desired without removing it from the toolholder.

In the precision machining of work pieces using boring tools, lathe tools and the like, it is essential that the cutter, such as a disposable cutting insert of hard metal carbide or other suitable material, be accurately positioned with relation to the toolholder. It is further important that as cutting inserts wear, they be capable of ready replacement and adjustment without removing the cartridge from the toolholder. It is also desirable that such cartridges be capable of being preset if desired before insertion in the toolholder.

A primary object of the present invention, therefore, is to provide a simply adjusted cutter bit cartridge for toolholders as indicated which can be preset before insertion in the toolholder and or set and reset as desired in the toolholder.

Those features of the invention which are believed to be novel are set forth with particularity in the claims appended hereto. The invention will, however, be better understood and further advantages and objects thereof appreciated from a consideration of the drawing in which FIG. 1 shows the present cartridge inserted in a toolholder;

Briefly, the cartridge of the present invention comprises a body portion having slidably and adjustably attached thereto a lateral or radial adjusting wedge having a slot therein which engages a cam portion of a rotatable spring-loaded pin or screw which passes through the cartridge body, the head of the pin having a slot or other provision therein for adjustment. The longitudinal adjustment of the cartridge within the toolholder recess is attained by means of an adjusting screw or bolt projecting from the rear of the cartridge. The cartridge is locked within the toolholder recess by means of a locking wedge, the attaching screw or bolt for which can be spring-loaded as desired to facilitate adjustment of the cartridge without loosening or removal from the toolholder recess.

Figure 1:
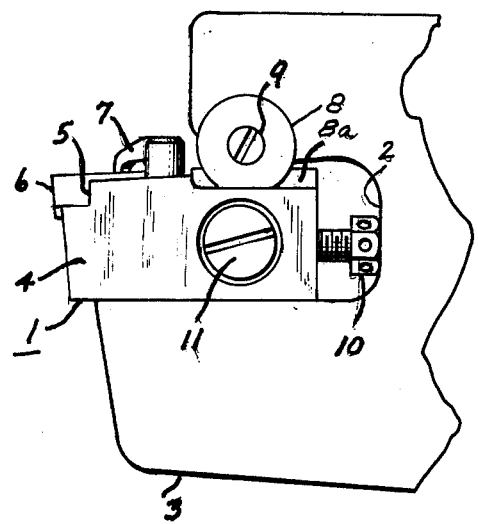

Referring to FIG. 1, cartridge 1 is shown mounted in recess 2 of toolholder 3. Cartridge 1 has a body portion 4 having a pocket 5 for the reception of insert 6 of any usual type which is held in place by clamp 7 or any other holding means well known to those skilled in the art. The cartridge is held in place in the recess 2 of toolholder 3 by means of a lock wedge 8 which cooperates with a sloping mating cartridge body surface 8a and toolholder recess 2, the lock wedge being held in place by adjustable lock screw 9. If desired, screw 9 can be spring-loaded as by spring washers or by any other desired, well-known means so that cartridge 1 can be adjusted under the resilient loading of wedge 8 while mounted in the toolholder. Longitudinal adjustment of the cartridge within the toolholder recess 2 is attained by adjusting screw 10.

Figure 3:
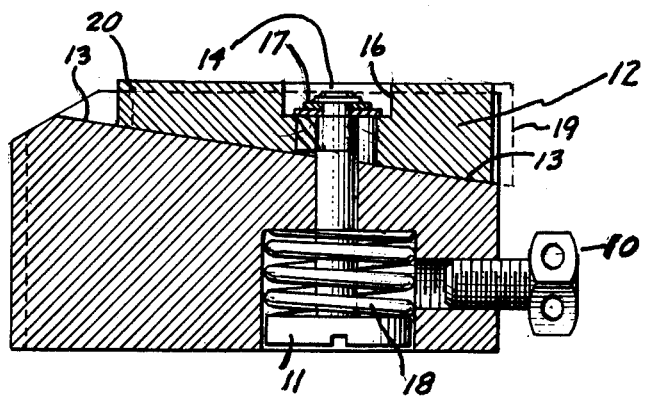
FIG. 3 is a cutaway view along the line 3—3 of FIG. 2.
Figure 2:
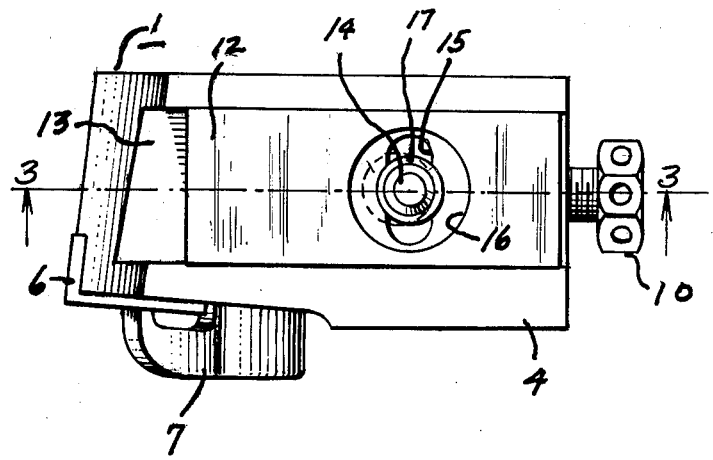
FIG. 2 is a view of the opposite side of the cartridge.

Shown at 11 is the head of the adjusting pin or screw. Best shown in FIG. 2 is the sliding lateral adjustment wedge 12 which is mounted in a mating recess 13 of cartridge body 4 for slidable movement therein by which is attained the lateral or radial adjustment of the cartridge within toolholder recess 2. Such lateral adjustment is accomplished by the cooperation of offset cam 14 of pin 11 which cooperates with slot 15 of adjusting wedge 12 to accomplish the desired to-and-fro and at the same time desired lateral movement of adjusting wedge 12. Slot 15 is mounted within recess 16 of adjusting wedge 12 and offset cam 14 of adjusting pin 11 is locked in place with a retaining ring or washer 17. Adjusting pin 11 is spring-loaded as at 18, best shown in FIG. 3. Also in FIG. 3, taken along line 3-3 of FIG. 2, is shown at broken lines 19 and 20 an alternate positioning of locking wedge 12 under the cooperation of cam 14 and slot 15.

In operation, the cartridge with mounted cutting insert can, as pointed out above, be preset before insertion in the toolholder recess by turning pin 11 to the desired lateral or radial adjustment according to preset standards and longitudinally adjusting screw 10, once again to fixed standards. Once adjusted, the cartridge 1 is inserted in recess 2 of the toolholder and locked in place by means of lock wedge 8 either fixedly or in an adjusted resilient manner.

In adjusting the cartridge while mounted in the toolholder, lock wedge 8 is loosened sufficiently to permit lateral adjustment of the cartridge through the operation of pin 11 and its cam 14 for the movement of wedge 12 for lateral adjustment and the adjustment of longitudinal adjusting screw 10. If lock wedge 8 is spring-loaded, lateral adjustment through the interaction of pin 11, cam 14 and lock wedge 12 as well as longitudinal adjustment can be attained without loosening lock wedge 8, such adjustment being made against the spring loading of the lock wedge 12.

It will be seen that with the cartridge described above, very accurate adjustment of the cutter bit, both transversely or laterally as well as longitudinally in the toolholder, can be readily achieved without removal of the cartridge from the toolholder whenever cutter inserts are changed. At the same time, preadjustment of the cartridge before insertion in the toolholder is easily and accurately attained.

What I claim as new and desire to secure by Letters Patent of the United States is:

1. A cutting tool comprising a toolholder having a recess to receive an adjustable cartridge and an adjustable cartridge therein, said cartridge comprising a body member adapted to hold a cutting insert at one end, and an adjusting wedge member slidable mounted in a corresponding recess in said body member, rotatable eccentric means mounted in and extending through said body member and said wedge for holding said body member and said wedge member together and for effecting lateral movement of said adjusting wedge member relative to said body member means for holding said cartridge in said toolholder and means for longitudinally positioning said cartridge in said toolholder recess.

2. A cutting tool as in claim 1 wherein the means for holding said cartridge in said toolholder comprises an adjustable locking wedge having a corresponding recess in said cartridge.

3. A cutting tool as in claim 2 wherein said adjustable locking wedge is held in place with a locking screw.

4. A cutting tool as in claim 3 wherein spring-loading means is mounted on said lock screw.

5. A cutting tool as in claim 1 wherein said eccentric means engages a slot in said adjusting wedge to provide lateral wedge and cartridge movement.

6. A cutting tool as in claim 1 wherein said eccentric means is spring-loaded.

7. A cutting tool as in claim 1 wherein said eccentric means comprises an offset cam on an adjustable pin.

* * * * *

UNITED STATES PATENT OFFICE
CERTIFICATE OF CORRECTION

PATENT NO. 4,030,176

DATED June 21, 1977

INVENTOR(S): Ronald E. Michonski

It is certified that error appears in the above-identified patent and that said Letters Patent are hereby corrected as shown below:

Claim 1, line 5, change "slidable" to - slidably -

Signed and Sealed this

Thirteenth Day of September 1977

[SEAL]

Attest:

RUTH C. MASON
Attesting Officer

LUTRELLE F. PARKER
Acting Commissioner of Patents and Trademarks